(12) United States Patent
Renosky

(10) Patent No.: US 7,621,068 B1
(45) Date of Patent: Nov. 24, 2009

(54) FISHERS LURE

(76) Inventor: Joseph Francis Renosky, P.O. Box 1198, Indiana, PA (US) 15701

( * ) Notice: Subject to any disclaimer, the term of this patent is extended or adjusted under 35 U.S.C. 154(b) by 0 days.

(21) Appl. No.: 11/986,325

(22) Filed: Nov. 21, 2007

Related U.S. Application Data

(60) Provisional application No. 60/861,515, filed on Nov. 29, 2006.

(51) Int. Cl.
*A01K 85/00* (2006.01)
*A01K 85/01* (2006.01)
*A01K 85/18* (2006.01)
*A01K 85/14* (2006.01)

(52) U.S. Cl. .................... 43/42.15; 43/42.47; 43/42.49; 43/42.31; 43/42.39; 43/42.03; 43/42.5; 43/42.52

(58) Field of Classification Search .............. 43/42.15, 43/42.47, 42.49, 42.31, 42.03, 42.39, 42.5, 43/42.52, 42.36
See application file for complete search history.

(56) References Cited

U.S. PATENT DOCUMENTS

| | | | | |
|---|---|---|---|---|
| 1,297,617 A | * | 3/1919 | Welles | 43/42.47 |
| 1,333,154 A | * | 3/1920 | Buddle | 43/42.47 |
| 1,418,229 A | * | 5/1922 | Buddle | 43/42.18 |
| 1,489,043 A | * | 4/1924 | Reinewald | 43/42.36 |
| 1,585,943 A | * | 5/1926 | Streich | 43/42.5 |
| 1,600,653 A | * | 9/1926 | Steenstrup | 43/42.47 |
| 1,622,063 A | * | 3/1927 | Steenstrup | 43/42.47 |
| 1,644,151 A | * | 10/1927 | Rodgers | 43/42.47 |
| 1,910,742 A | * | 5/1933 | Binns | 43/42.52 |
| 1,986,738 A | * | 1/1935 | Mitchell | 43/42.49 |
| 1,994,678 A | * | 3/1935 | Yarvise | 43/42.15 |
| 1,997,900 A | * | 4/1935 | Edwards | 43/42.47 |
| 2,000,734 A | * | 5/1935 | Accetta | 43/42.18 |
| 2,017,333 A | * | 10/1935 | Zuck | 43/42.47 |
| 2,032,819 A | * | 3/1936 | Tengel | 43/42.18 |
| 2,051,978 A | * | 8/1936 | Accetta | 43/42.18 |
| 2,102,492 A | * | 12/1937 | Stolley | 43/42.36 |
| 2,110,382 A | * | 3/1938 | Martin | 43/42.49 |
| 2,189,958 A | * | 2/1940 | Middlemiss | 43/42.49 |
| 2,274,596 A | * | 2/1942 | Fink | 43/42.39 |
| 2,290,433 A | * | 7/1942 | Jeffers | 43/42.47 |
| 2,291,422 A | * | 7/1942 | Thomas | 43/42.39 |
| 2,423,717 A | * | 7/1947 | Mikina | 43/42.36 |
| 2,461,755 A | * | 2/1949 | Miller | 43/42.36 |
| 2,463,889 A | * | 3/1949 | Lundemo | 43/42.39 |
| 2,481,445 A | * | 9/1949 | Premo, Jr. | 43/42.36 |
| 2,522,179 A | * | 9/1950 | Jensen, Sr. et al. | 43/42.36 |
| 2,523,949 A | * | 9/1950 | Gambill | 43/42.47 |
| 2,585,494 A | * | 2/1952 | Pelto | 43/42.49 |
| 2,587,658 A | * | 3/1952 | Sleness | 43/42.36 |
| 2,588,055 A | * | 3/1952 | Smith | 43/42.15 |
| 2,608,016 A | * | 8/1952 | Shipley | 43/42.47 |
| 2,618,096 A | * | 11/1952 | Wagner | 43/42.47 |
| 2,644,265 A | * | 7/1953 | Stettner | 43/42.47 |
| 2,685,145 A | * | 8/1954 | Dean | 43/42.15 |
| 2,698,494 A | * | 1/1955 | Larsen | 43/42.5 |
| 2,716,831 A | * | 9/1955 | Glass | 43/42.47 |
| 2,755,592 A | * | 7/1956 | Bocchino | 43/42.36 |
| 2,817,921 A | * | 12/1957 | Czesnocha | 43/42.18 |

(Continued)

*Primary Examiner*—Darren W Ark
(74) *Attorney, Agent, or Firm*—Mark Manley; George H. Morgan PE

(57) ABSTRACT

A fishers lure comprising a plug that is weightable with internal weighting, and a trapezoidal shaped blade with an upturned nose and rounded front corners.

16 Claims, 11 Drawing Sheets

U.S. PATENT DOCUMENTS

| | | | | |
|---|---|---|---|---|
| 2,886,914 A * | 5/1959 | Lievense | | 43/42.15 |
| 2,925,681 A * | 2/1960 | Hughes | | 43/42.5 |
| 2,945,318 A * | 7/1960 | Lassiter | | 43/42.47 |
| 2,948,984 A * | 8/1960 | Crawford | | 43/42.39 |
| 3,044,207 A * | 7/1962 | Dorsett | | 43/42.31 |
| 3,148,474 A * | 9/1964 | Smith | | 43/42.36 |
| 3,218,750 A * | 11/1965 | Lewin | | 43/42.39 |
| 3,248,820 A * | 5/1966 | Lamar | | 43/42.52 |
| 3,264,775 A * | 8/1966 | Nahigian | | 43/42.5 |
| 3,293,790 A * | 12/1966 | Konomos | | 43/42.15 |
| 3,367,057 A * | 2/1968 | Pond | | 43/42.47 |
| 3,389,490 A * | 6/1968 | Peters et al. | | 43/42.39 |
| 3,405,475 A * | 10/1968 | Ross | | 43/42.52 |
| 3,412,500 A * | 11/1968 | Lahitnen | | 43/42.49 |
| 3,462,871 A * | 8/1969 | McVay | | 43/42.47 |
| 3,541,718 A * | 11/1970 | Norman | | 43/42.47 |
| 3,753,310 A * | 8/1973 | Werner | | 43/42.47 |
| 3,902,267 A * | 9/1975 | Monchil | | 43/42.47 |
| 4,141,171 A * | 2/1979 | Muddiman | | 43/42.47 |
| 4,142,319 A * | 3/1979 | Mihaljevic | | 43/42.49 |
| 4,155,192 A * | 5/1979 | Varaney | | 43/42.5 |
| 4,183,164 A * | 1/1980 | Young et al. | | 43/42.36 |
| 4,223,469 A * | 9/1980 | Luz | | 43/42.03 |
| 4,432,157 A * | 2/1984 | Gowing | | 43/42.52 |
| 4,453,333 A * | 6/1984 | Olson | | 43/42.5 |
| 4,660,318 A * | 4/1987 | Mieno | | 43/42.52 |
| 4,738,047 A * | 4/1988 | Ryan | | 43/42.47 |
| 4,823,497 A * | 4/1989 | Pierce | | 43/42.31 |
| 4,969,287 A * | 11/1990 | Johnson | | 43/42.31 |
| 5,077,931 A * | 1/1992 | Marshall | | 43/42.52 |
| 5,134,799 A * | 8/1992 | Trnka | | 43/42.31 |
| 5,157,859 A * | 10/1992 | Wirkus | | 43/42.52 |
| 5,168,652 A * | 12/1992 | Davis | | 43/42.49 |
| 5,197,221 A * | 3/1993 | Kresl | | 43/42.47 |
| 5,216,830 A * | 6/1993 | Brott, II | | 43/42.39 |
| 5,276,992 A * | 1/1994 | Kato | | 43/42.31 |
| 5,337,508 A * | 8/1994 | Pfeiffer | | 43/42.03 |
| 5,490,347 A * | 2/1996 | Conley | | 43/42.47 |
| 5,537,770 A * | 7/1996 | Storm et al. | | 43/42.39 |
| 5,546,694 A * | 8/1996 | Wilkinson | | 43/42.47 |
| 5,586,405 A * | 12/1996 | Fike | | 43/42.31 |
| 5,600,916 A * | 2/1997 | Smith | | 43/42.47 |
| 5,822,912 A * | 10/1998 | Kato et al. | | 43/42.31 |
| 5,857,283 A * | 1/1999 | Perrick | | 43/42.5 |
| 5,887,378 A * | 3/1999 | Rhoten | | 43/42.03 |
| 5,918,406 A * | 7/1999 | Wilson | | 43/42.15 |
| 5,937,569 A * | 8/1999 | Solheim et al. | | 43/42.47 |
| 5,956,889 A * | 9/1999 | West | | 43/42.5 |
| 5,992,083 A * | 11/1999 | Deng et al. | | 43/42.15 |
| 6,212,818 B1 * | 4/2001 | Huddleston | | 43/42.15 |
| 6,374,535 B1 * | 4/2002 | Bailey | | 43/42.47 |
| 6,484,434 B1 * | 11/2002 | Elges | | 43/42.47 |
| 6,510,646 B1 * | 1/2003 | Kechriotis | | 43/42.31 |
| 6,578,313 B1 * | 6/2003 | Knol | | 43/42.47 |
| 6,912,808 B1 * | 7/2005 | Mak | | 43/42.47 |
| 7,107,720 B2 * | 9/2006 | Burggrabe et al. | | 43/42.47 |
| 7,197,846 B1 * | 4/2007 | Gibson | | 43/42.5 |
| 7,234,266 B2 * | 6/2007 | Thomas | | 43/42.47 |
| 7,310,906 B1 * | 12/2007 | Woller, Sr. | | 43/42.31 |
| 7,493,724 B1 * | 2/2009 | Peterson | | 43/42.47 |
| 2001/0045048 A1 * | 11/2001 | Johnson | | 43/42.39 |
| 2005/0086849 A1 * | 4/2005 | Perrick | | 43/42.47 |
| 2005/0210731 A1 * | 9/2005 | Davis | | 43/42 |
| 2005/0246940 A1 * | 11/2005 | Jones et al. | | 43/42.47 |
| 2006/0112608 A1 * | 6/2006 | Snyder | | 43/42.15 |
| 2006/0191186 A1 * | 8/2006 | Perrick | | 43/42.47 |
| 2007/0199234 A1 * | 8/2007 | Davis | | 43/42.47 |
| 2008/0010893 A1 * | 1/2008 | Polachek | | 43/42.47 |
| 2008/0172924 A1 * | 7/2008 | Thorne | | 43/42.47 |
| 2008/0263935 A1 * | 10/2008 | Albrecht et al. | | 43/42.47 |
| 2009/0211145 A1 * | 8/2009 | Thorne | | 43/42.39 |

\* cited by examiner

FISHERS LURE

CROSS REFERENCES TO RELATED APPLICATIONS

Provisional Application for Patent No. 60/861,515, filed Nov. 29, 2006 with the same title, "Fishers Lure", which is hereby incorporated by reference. Applicant claims priority pursuant to 35 U.S.C. Par. (e)(i).

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to a fishers lure with a blade attached to a plug. A leader line attaches to the blade. An erratic motion is imparted to the plug, enhancing the ability of the plug to attract the attention of a fish. Also, weights are incorporated into the plug to control rate and depth of descent of the plug in water.

2. Background Information

There is a CHATTERBAIT™ product by Radd Lures that comprises a blade on a swimming jig head that is directed towards a different type of fishing than the present invention. The blade shape is different and the lead swimming jig head has no buoyancy.

Countless lures attempt to imitate a live small fish. If a predator is hungry enough, this may suffice.

It is easy for a fisher to catch a hungry fish. The challenge is to catch a fish that isn't hungry.

It takes energy for a predator to catch prey. The predator is balancing risk and energy required to catch a given prey versus the risk of going hungry.

Predators that aren't hungry will generally ignore prey, conserving energy and avoiding risk.

However, injured fish are easier to catch. So, if a lure appears as an injured small fish, a predator that isn't hungry is more apt to strike at what appears to be a free meal, i.e. no energy expense.

As will be seen from the subsequent description, the preferred embodiments of the present invention overcome limitations of existing approaches in the endless struggle of fishers to prove they are smarter than their quarry.

SUMMARY OF THE INVENTION

The present invention, in the preferred embodiment, is a fishers lure comprising a plug that is weightable with internal weighting, and a trapezoidal shaped blade with an upward nose curve and a rounded nose. The blade is attachable near or at the nose, lips or head of the plug in the preferred embodiment or ahead of the center of gravity of the lure. A fishers leader line is attached to the blade for use. The plug comprises a rigid plastic body, figure eight loops molded into the body, and at least one set of at least one hook. For best results, the plug comprises three sets of hooks, with each set comprising three hooks. The rigid plastic body further comprises internal weighting, in the preferred embodiment of the present invention.

DESCRIPTION OF THE PREFERRED EMBODIMENT

Figure 1:
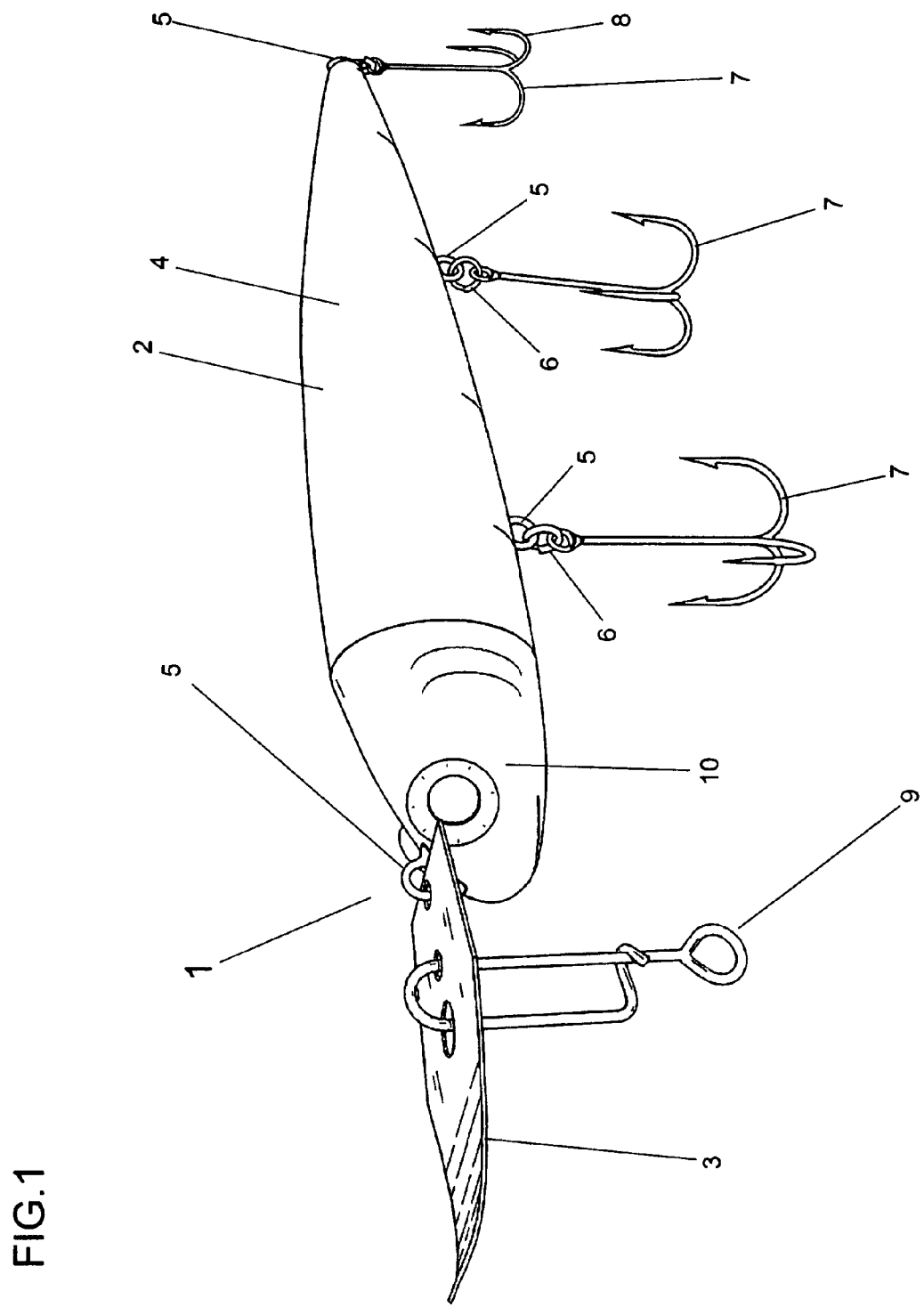
FIGS. 1 through 4 illustrate the preferred embodiment of the present invention, a fishers lure.

FIGS. 1 through 4 and 9 illustrate the preferred embodiment of the present invention, a fishers lure 1, comprising a plug 2 and a blade 3.

The plug 2 comprises a body 4 with loops 5 and 5a molded into the body 4, at least one split ring 6 for connecting a hook set 7 to at least one of the loops 5. A hook set 7 comprises at least one hook 8. In the preferred embodiment of the present invention, there are three hooks sets 7 each comprising three hooks.

Referring also to FIGS. 5 through 8, the blade 3, in the preferred embodiment, has multiple sides and is attached to the plug 2 by means of one of the loops 5. A wire clip 9 attaches to the blade 3 for attachment of a fisher's leader line 13, the blade 3 has holes 34 and 35 to accommodate the wire clip 9. The blade 3 can be attached anywhere from the forward end 10 of the body 4 up to the center of line of the body 4.

Figure 2:
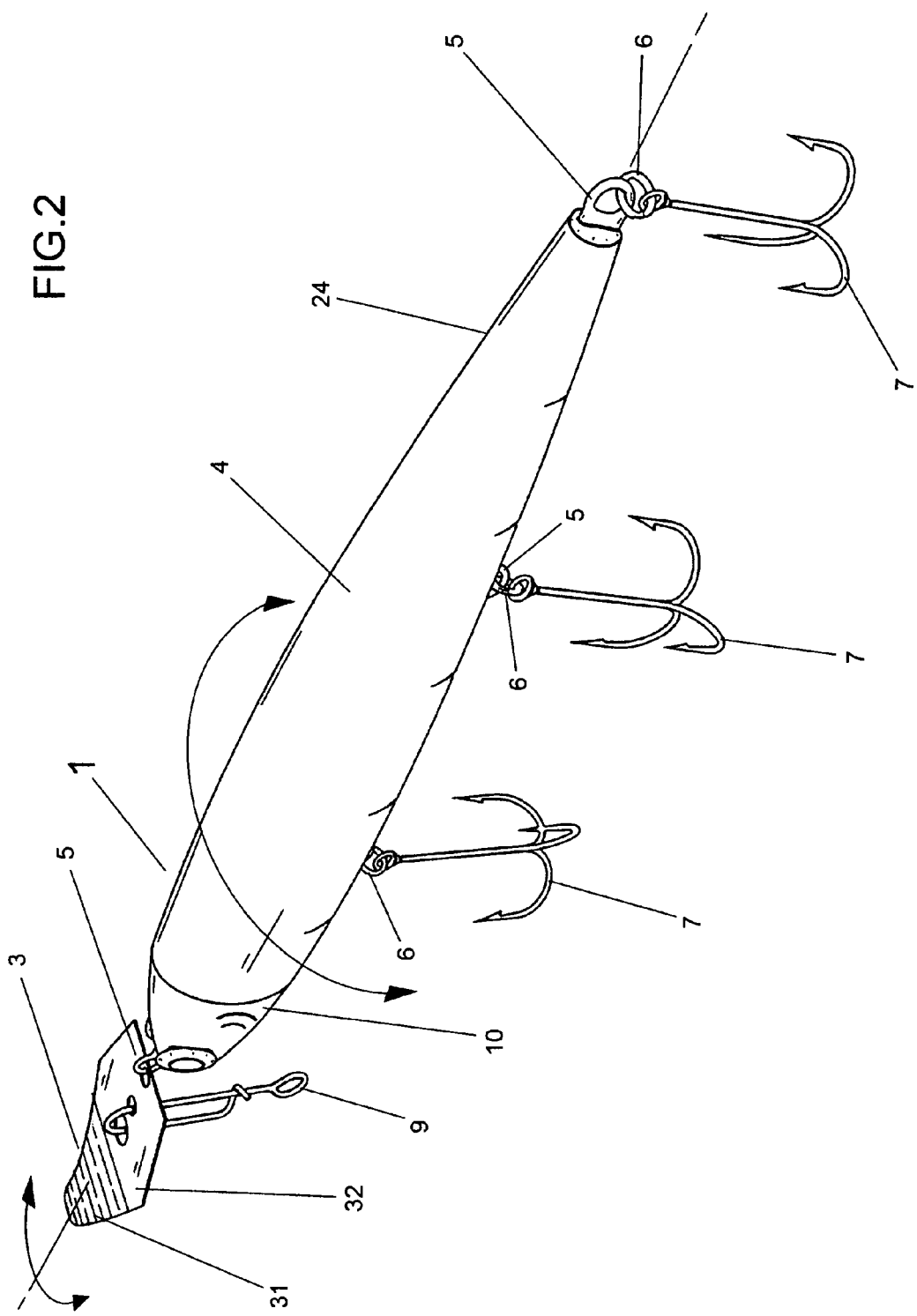
Figure 3:
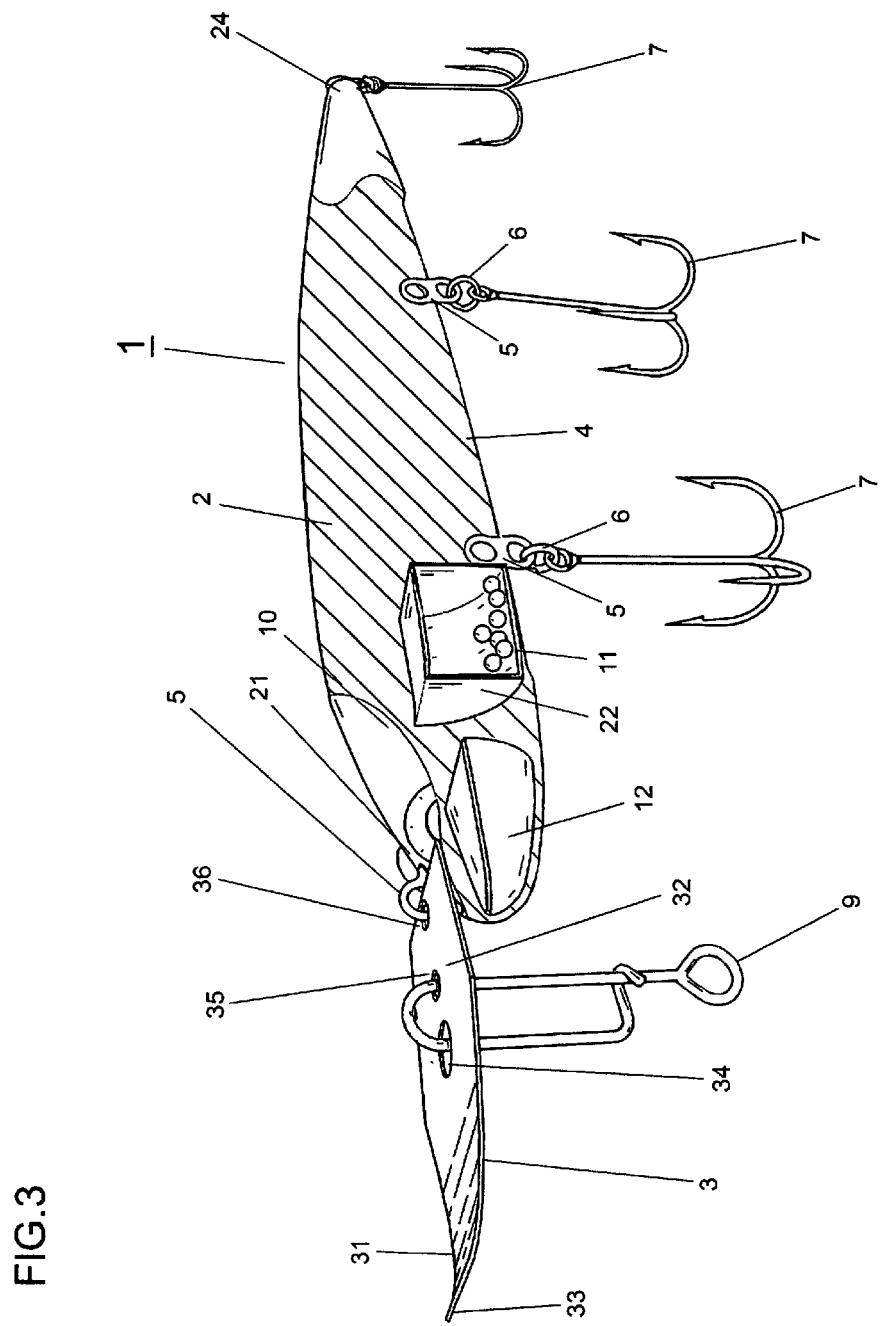
Figure 4:
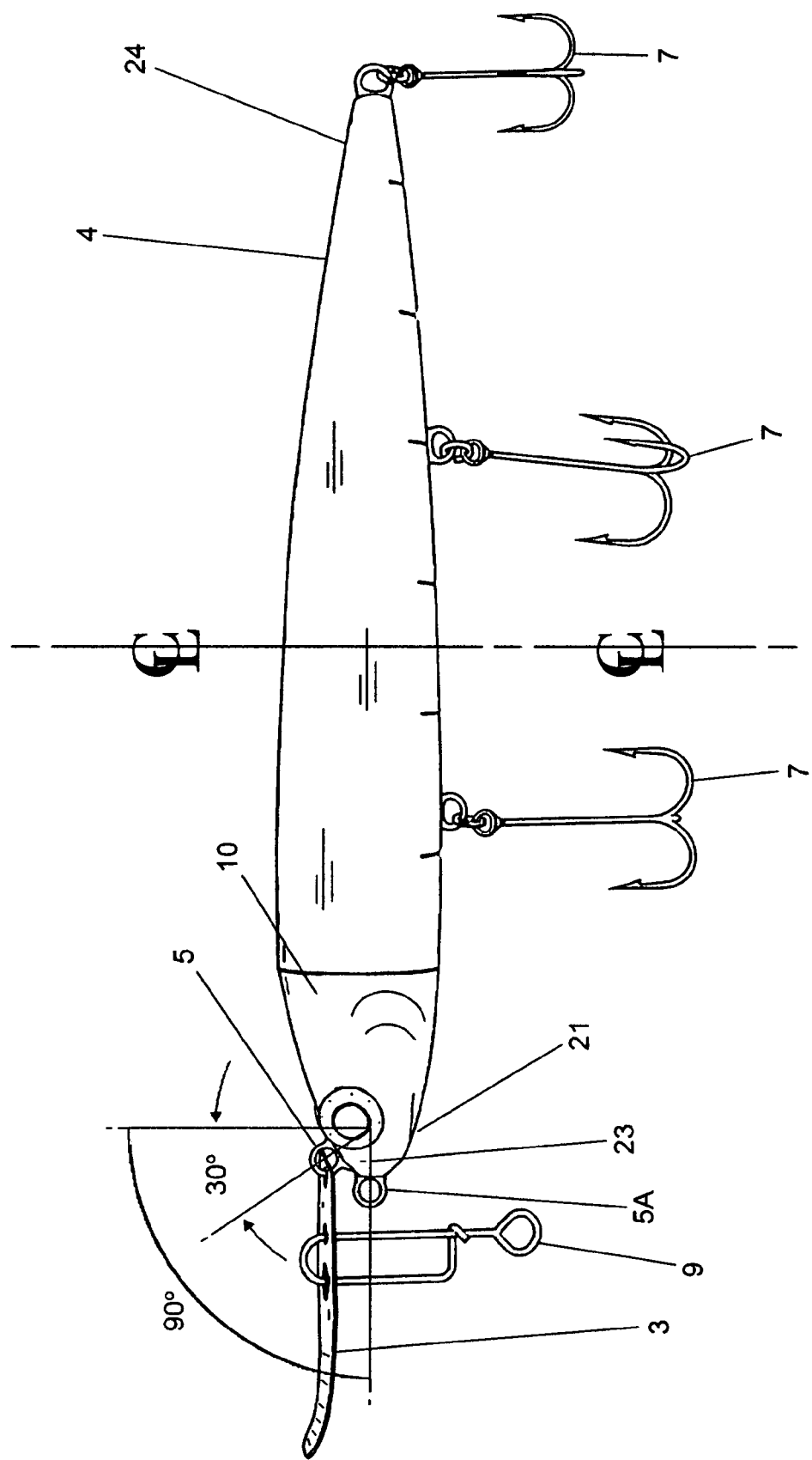
Figure 11:
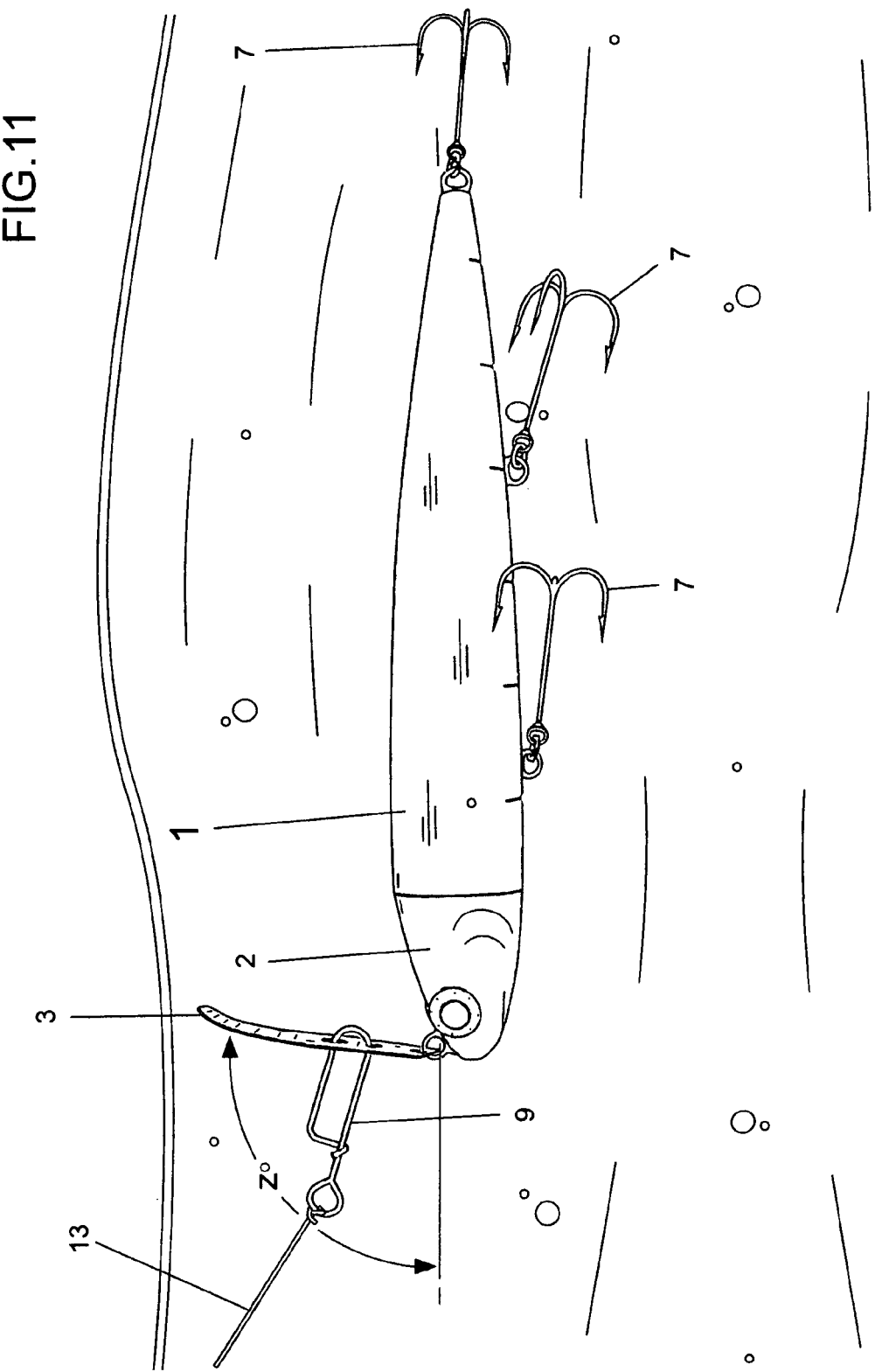
FIG. 11 shows the lure in use.

An optimum placement is indicated in FIG. 4, where one of the loops 5 is shown at 30 degrees from a vertical line into the eye 21 of the body. Referring to FIG. 3 the curved portion 31 of the blade 3 that is forward of the bend and attachment point 34 is important as it causes instability as the blade 3 is pulled through the water. The instability caused by curved portion 31 gives the user substantial control over the amount of thrashing the lure body 4 will do as it is pulled through the water. Specifically as shown in FIGS. 2 and 11, as the lure is pulled through the water the blade 3 assumes an angle of attack Z such that the planar portion 32 of the blade 3 is nearly perpendicular to the length of the body 1. FIG. 2 shows that as the blade 3 oscillates back and forth as indicated by the double headed arrow at the front of the blade 3, the body 4 oscillates back and forth about the longitudinal axis of the body length. The back and forth motion of the body 4 about its longitudinal axis is indicated by double headed arrow wrapped around the body 4. This oscillation motion tends to rattle the weights 11.

In the preferred embodiment, the body 4 comprises internal weighting 11, which is a metal such as lead in the preferred embodiment, for buoyancy purposes, to control both rate of descent and depth of descent. In the preferred embodiment, the weighting is internal in locations such as nose 12 indicated in the partial cross section of FIG. 3. The body 4 further comprises rattles 11 contained in cavities 22 for creating noise as the body 4 moves and thrashes in the water.

FIG. 4 shows an approximate vertical centerline of the lure body 4 and as can be seen in FIGS. 3 and 4 the weights 11 and 12 are forward of the centerline which will tend to keep the nose portion 2 of the lure body 4 down even as the blade 3 tends to lift up as shown in FIG. 11 as the lure 1 is pulled through the water. As shown in FIG. 4 the phantom line passing horizontally through the loop 5a is approximate the center of gravity along the length of the lure body 4, the blade 3 should be attached above this center of gravity for optimum performance.

Figure 5:
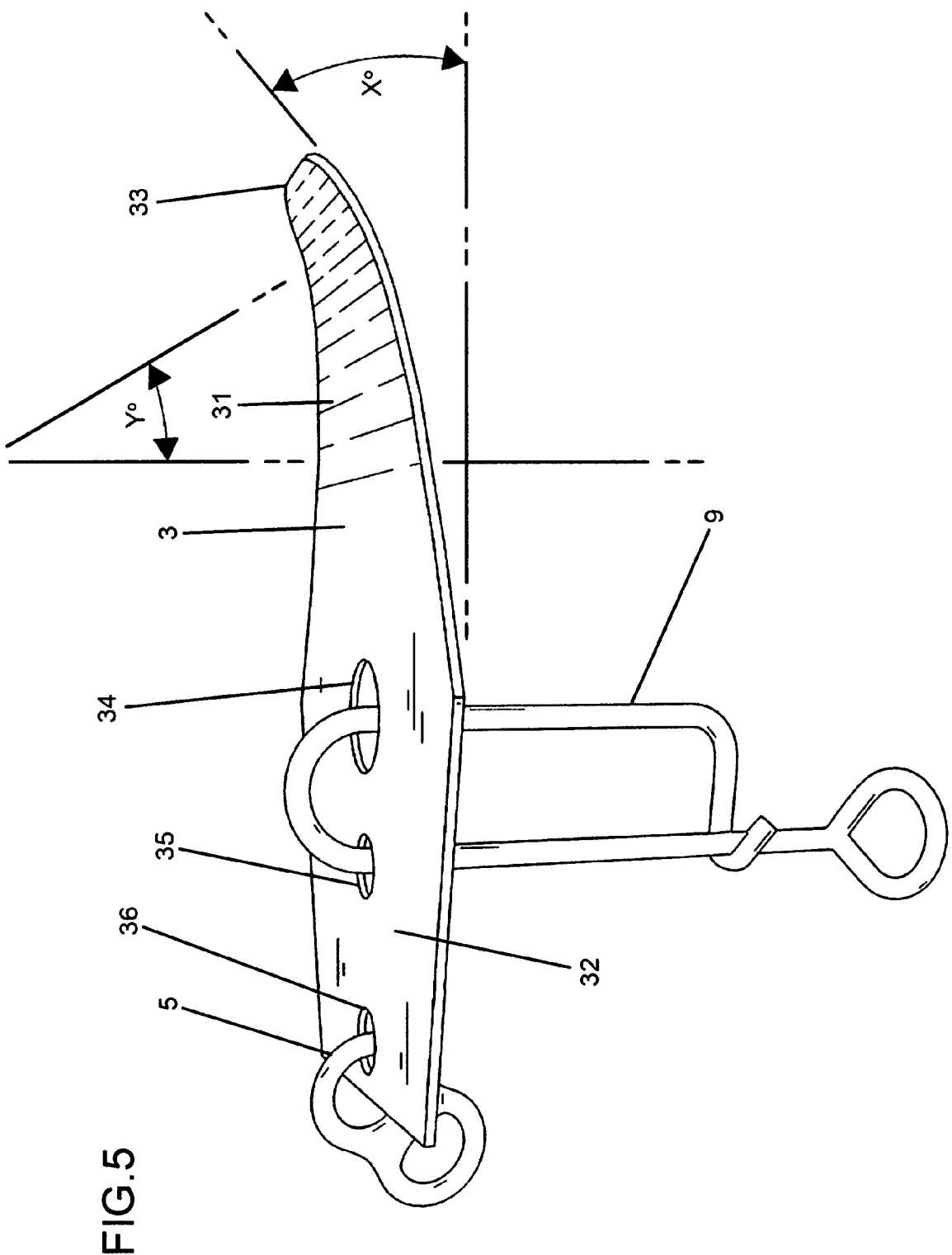
FIGS. 5 through 8 illustrate the fishers lure's blade.
Figure 6:
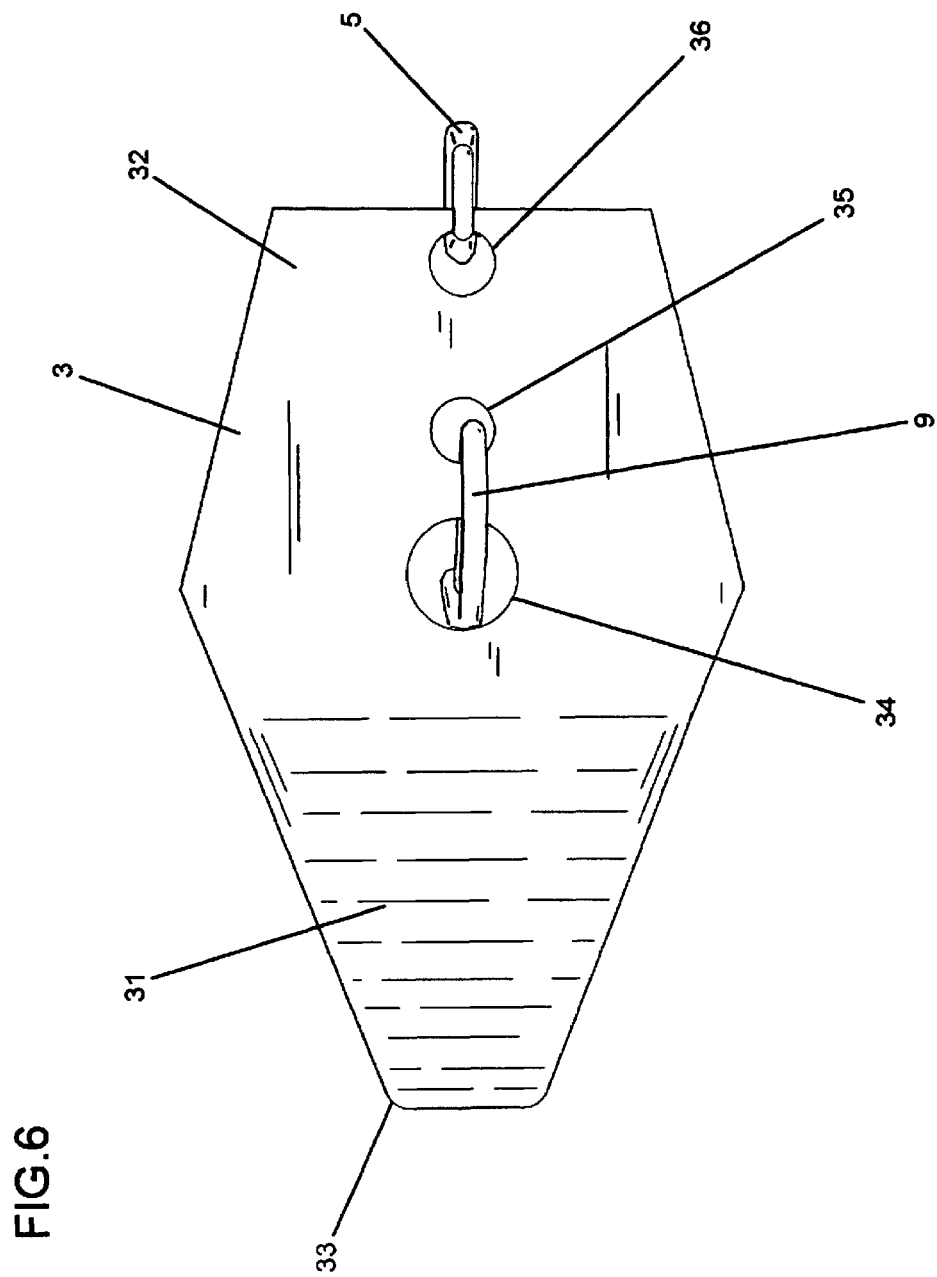
Figure 7:
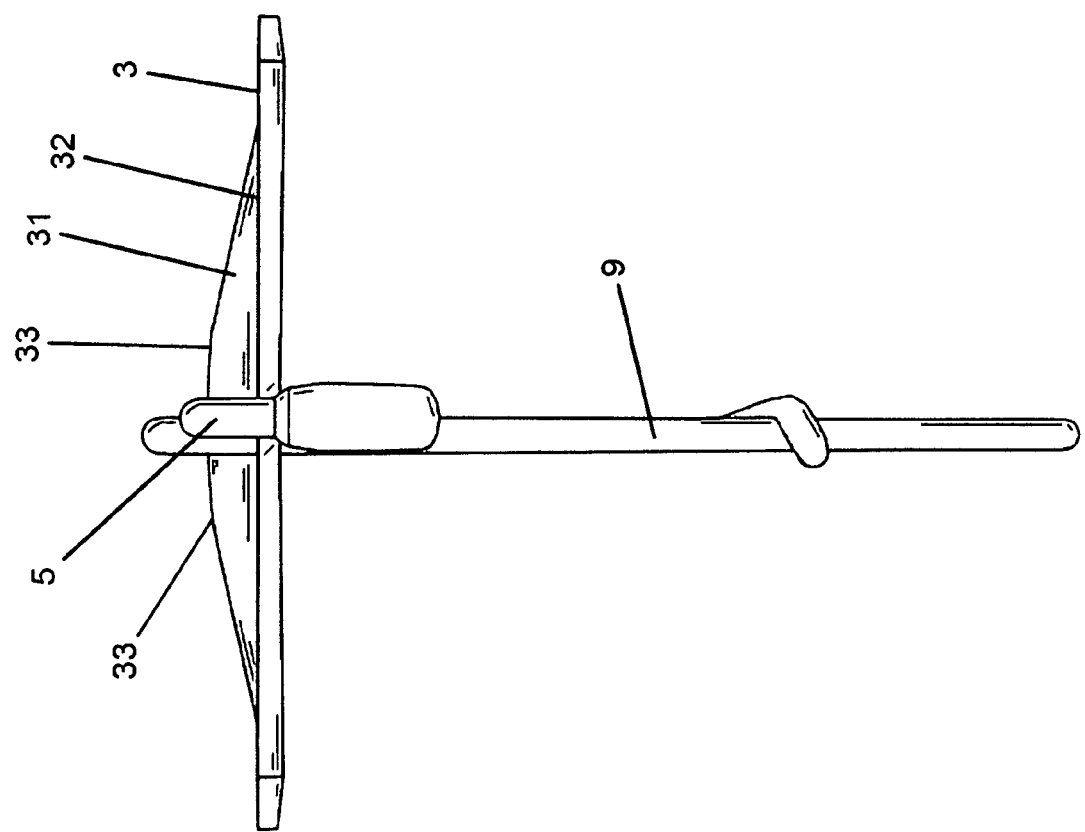
Figure 8:
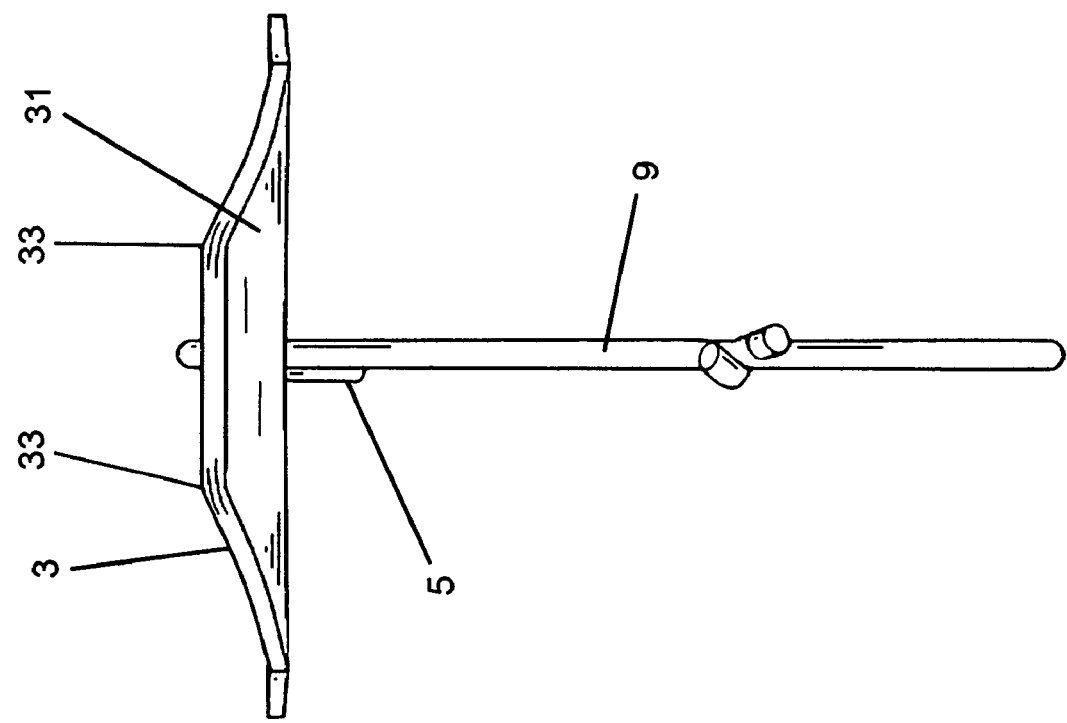

FIG. 5 shows that the blade 3 is curved through an angel Y to achieve a total bend of X compared to the flat portion of the blade 32. Y can be in a range of 0 to 90 degrees and X can be in the range of 0 to 90 degrees. Ideal results have been found with X and Y in the range of 30 to 60 degrees. This curved portion 31 serves as a nose for the blade 3 and leads the rest of the blade 3 and lure 1 as the lure 1 is pulled through the water.

The curved portion 31 tends to cause the blade 3 to tip backwards as shown in FIG. 11 as the blade 3 is pulled through the water.

Figure 9:
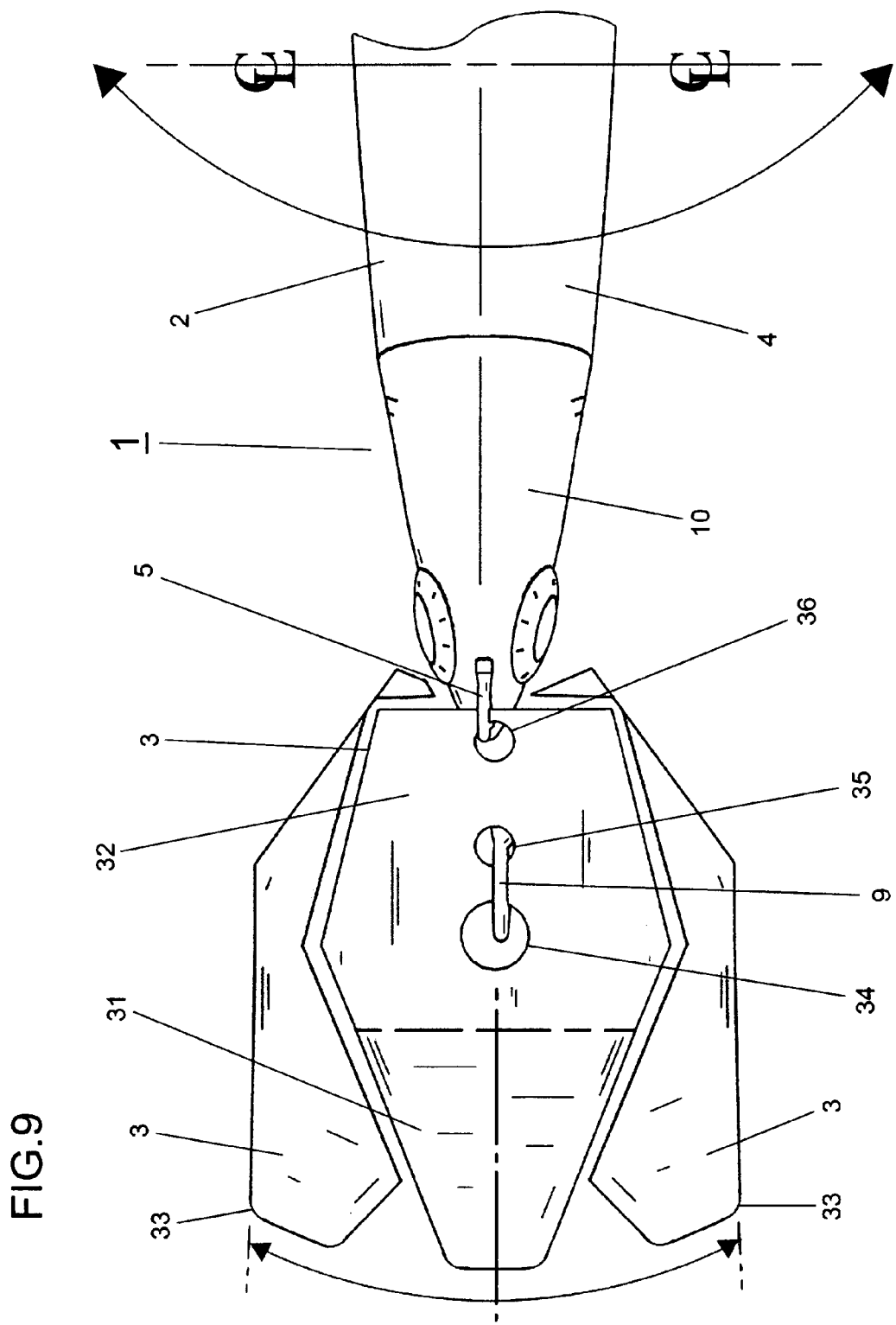
FIG. 9 illustrates blade movement.

Referring to FIG. 9, as a fisher is pulling on the lure 1, action of the unstable blade 3 attached to the plug 2, causes the blade 3 to swivel from left to right, oscillating back and forth, laterally, as indicated by the double headed arrow and the positions indicated, about the loop 5 connecting the blade 3 to the body 4. This movement imparts an erratic action to the plug 4, simulating an injured fish. As the blade 3 is pulled through the water the blade 3 is angled to the direction of pull. The blade portion 31 experiences a great deal of water resistance. The blade 3 is analogous to a kite without a tail. This creates an action that applicant finds so enticing to a predator such as, but not limited to, a fish, that the fishers lure 1 catches even fish that are not hungry. The fishing lure 1 attracts fish in a manner beyond anything with which the applicant is familiar.

Figure 10:
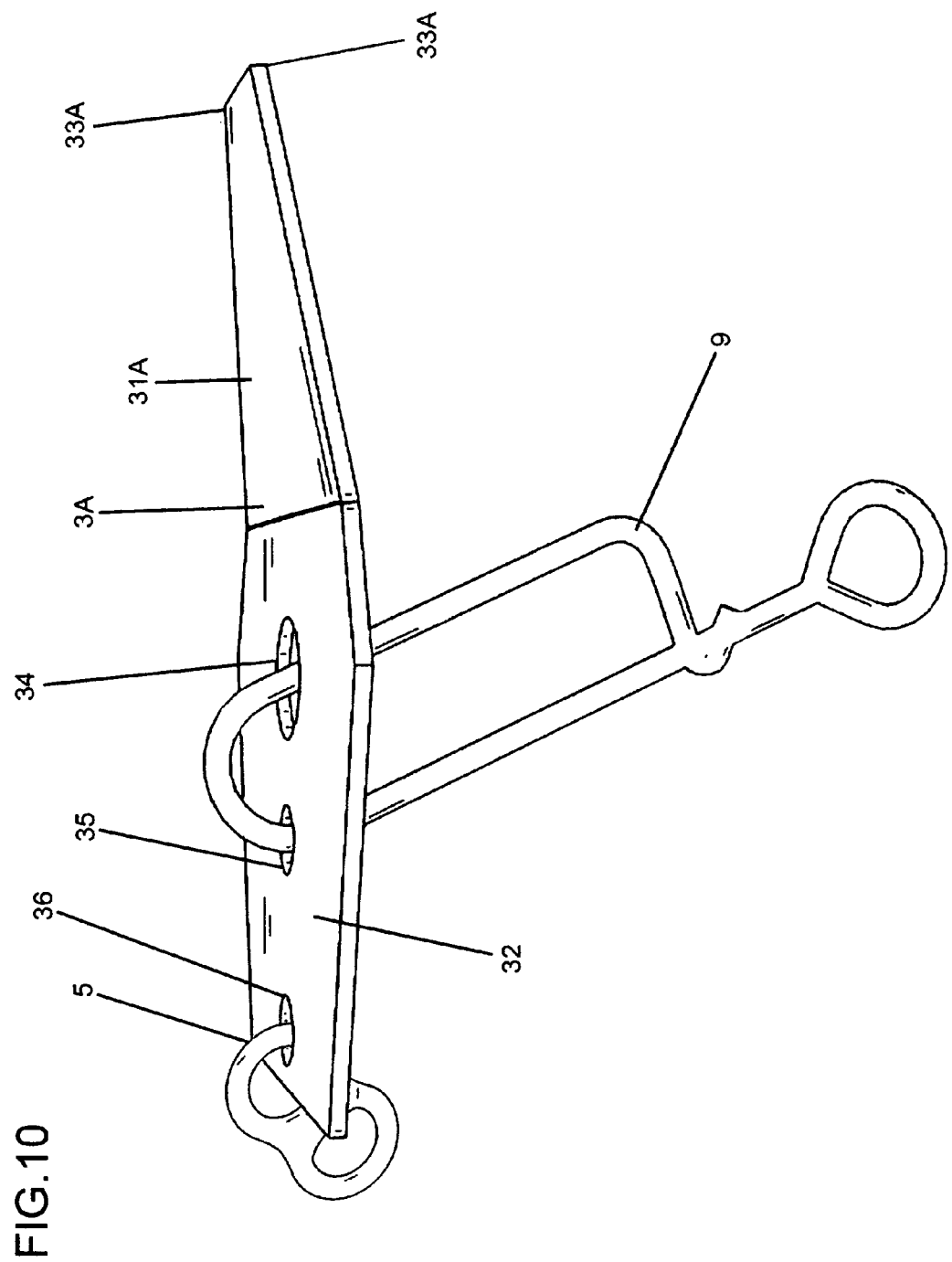
FIG. 10 shows a second embodiment of the lure.

FIG. 10 shows an alternate embodiment of the blade 3A where portion 31A is flat planar piece. This also works. FIG. 10 shows the corners 33A of the blade 3A can be sharp.

FIG. 11 shows the lure 1 in use in the water. The pull on the line 13 transmitted through the wire clip 9 causes the blade 3 to assume an angle of attack 'Z' in the water. That is to say the planar portion of the blade 32 travels at an angle that causes significant resistance as it is pulled through the water. The angle Z and resistance causes the blade 3 to oscillate back and forth as shown by the front arrow in FIG. 2.

Although the description above contains many specificities, these should not be construed as limiting the scope of the invention but as merely providing illustrations of some of the presently preferred embodiments of this invention.

It will be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. A fishers lure comprising:
   a rigid plastic body; and
   a blade,
   wherein the blade is movably attached to the rigid plastic body;
   wherein the plastic body has a fixed weight for buoyancy control;
   wherein the blade has a multiple sided shape, with rounded front corners and an upturned nose;
   wherein the blade is movably attached to the body by a loop on the body, said loop being just above said fixed weight, and when the lure is pulled through the water said blade swivels laterally, and wherein said plastic body has a cavity containing rattle weights which move laterally in the cavity and rattle as the body moves laterally, wherein said blade and said body are attached to a fishing line by an eye, and said eye includes at least one wire connector leg that connects the eye to the blade, and the wire connector leg can pivot relative to the blade, and said eye is spaced from said blade, and said blade assumes an unstable position perpendicular to a length of the body as the lure is pulled through the water by said line in a direction perpendicular to the lateral movement of the body, and wherein in said unstable position of said blade said eye is above said loop and said loop is above said fixed weight and said fixed weight is in front of the cavity and said cavity includes a curved bottom surface such that as said rattle weights move laterally they will travel up and down the curved surface.

2. The fishers lure of claim 1 wherein said lure body has the general appearance of a fish and has at least one hook along a lower portion thereof.

3. The fishers lure of claim 1 wherein said loop is attached to said body above a center of gravity of said lure.

4. A fishers lure comprising:
   a lure body; and
   a blade,
   wherein the blade is attached by a first loop to the lure body at a front portion of said lure body;
   wherein the lure body has a fixed weight weights for buoyancy control;
   wherein the blade has a first planar portion having a first attachment point for a fishing line and a second attachment point receiving said first loop, said second attachment point spaced from said first attachment point, said blade having a second portion connected to said first planar portion at a bend, said second portion being on an opposite side of said first attachment point from said lure body and, wherein said first attachment point is adjacent said fixed weight, and wherein said lure body has a cavity containing rattle weights which move laterally in the cavity and rattle as the body moves laterally,
   wherein said blade is attached to a fishing line by an eye, and said eye includes at least one connector leg that connects the eye to the blade at said first attachment point, and the at least one connector leg can pivot relative to the blade, and the eye is spaced from said blade, and said blade assumes an unstable position perpendicular to a length of the body as the lure is pulled through water by said line in a direction perpendicular to the lateral movement of said body, and wherein in said unstable position of said blade said eye is above said loop and said loop is above said fixed weight and said fixed weight is in front of the cavity and said cavity includes a curved bottom surface curved in a lateral direction of said body such that as said rattle weights move laterally they will travel up and down the curved surface.

5. The fishers lure of claim 4 wherein said lure body comprises rigid plastic and said blade comprises stamped metal sheet and said second portion of said blade has a nose which is curved upwardly.

6. The fishers lure of claim 4 wherein said lure body has the general appearance of a fish and has at least one hook along a lower portion thereof.

7. The fishers lure of claim 6 wherein said first loop is adjacent an eye of said fish and is located above and ahead of said eye at an angle of 30 degrees.

8. The fishers lure of claim 6 wherein said rattle weights are metal weights held loosely in said cavity such that they will create sound when said lure body moves.

9. The fishers lure of claim 8 wherein said first loop is attached above the center of gravity of said lure.

10. The fishers lure of claim 7 wherein said blade has a multiple sided outline.

11. A fishers lure comprising:
    a lure body; and
    a blade,
    wherein the blade is attached to said body by a first loop at a front portion of said lure body;
    wherein the blade has a first planar portion having a first attachment point for a fishing line and a second attachment point receiving said first loop, said second attachment point spaced from said first attachment point, said blade having a second blade portion connected to said first planar portion, said second blade portion being on an opposite side of said first attachment point from said lure body, wherein said first attachment portion causes said first planar portion to travel through the water in a direction at an angle of attack relative to said lure body, wherein said first portion and said second portion are not co-planar and wherein said body has a cavity containing rattle weights which move laterally in the cavity and rattle as the body moves laterally, wherein said blade is attached to a fishing line by an eye, and the eye includes at least one connector leg that connects the eye to the blade at said first attachment point, and the at least one connector leg can pivot relative to the blade, and the eye is spaced from said blade and said blade assumes an unstable position perpendicular to a length of the body as the lure is pulled through water by said line in a direction perpendicular to the lateral movement of the body and wherein in said unstable position of said blade said eye is above said loop and said loop is above said fixed weight and said fixed weight is in front of the cavity and said cavity includes a curved bottom surface such that as said rattle weights move laterally they will travel up and down the curved surface.

12. The fishers lure of claim 11 wherein said lure body has the general appearance of a bait animal and has at least one hook along a lower portion thereof.

13. The fishers lure of claim 12 wherein said first loop is adjacent a front end of said bait animal and said second blade portion is curved upward from said first planar portion.

14. The fishers lure of claim 11 wherein said blade has a multiple sided outline with rounded corners and wherein said second blade portion is planar.

15. The fishers lure of claim 14 wherein said first loop is attached above a center of gravity of said lure.

16. The fishers lure of claim 11 wherein said rattle weights are metal spheres held loosely in said cavity such that they will create sound when said lure body moves.

* * * * *